(12) United States Patent
Carapelli

(10) Patent No.: US 9,053,503 B2
(45) Date of Patent: Jun. 9, 2015

(54) FUELING ENVIRONMENT WIRELESS ARCHITECTURE

(75) Inventor: Giovanni Carapelli, Florence (IT)

(73) Assignee: Gilbarco, S.r.l., Florence (IT)

( * ) Notice: Subject to any disclaimer, the term of this patent is extended or adjusted under 35 U.S.C. 154(b) by 0 days.

(21) Appl. No.: 13/452,295

(22) Filed: Apr. 20, 2012

(65) Prior Publication Data
US 2013/0103585 A1    Apr. 25, 2013

Related U.S. Application Data

(60) Provisional application No. 61/477,918, filed on Apr. 21, 2011, provisional application No. 61/541,548, filed on Sep. 30, 2011.

(51) Int. Cl.
| | |
|---|---|
| *G06Q 20/00* | (2012.01) |
| *G06Q 30/06* | (2012.01) |
| *G06Q 20/20* | (2012.01) |
| *G06Q 20/32* | (2012.01) |
| *G07F 13/02* | (2006.01) |
| *G07G 1/00* | (2006.01) |
| *H04W 84/10* | (2009.01) |
| *H04W 84/18* | (2009.01) |

(52) U.S. Cl.
CPC .............. *G06Q 30/06* (2013.01); *G06Q 20/202* (2013.01); *G06Q 20/32* (2013.01); *G07F 13/025* (2013.01); *G07G 1/0081* (2013.01); *H04W 84/18* (2013.01); *H04W 84/10* (2013.01)
USPC .............................................. 705/44; 705/40

(58) Field of Classification Search
CPC ...................................................... G06Q 20/00
USPC ......................................................... 705/3-44
See application file for complete search history.

(56) References Cited

U.S. PATENT DOCUMENTS

| | | | |
|---|---|---|---|
| 5,596,501 A | * 1/1997 | Comer et al. | ................ 705/413 |
| 6,771,981 B1 | 8/2004 | Zalewski et al. | |
| 6,850,157 B1 | * 2/2005 | Yamamoto et al. | ........ 340/539.1 |
| 7,107,231 B1 | * 9/2006 | Hall et al. | ................. 705/14.61 |
| 7,168,297 B2 | * 1/2007 | Herzog et al. | ................ 73/49.2 |
| 7,664,885 B2 | 2/2010 | Carapelli | |
| 7,954,386 B2 | * 6/2011 | Nanaji et al. | ................... 73/861 |
| 8,036,906 B2 | * 10/2011 | Kojima et al. | ................ 705/1.1 |

(Continued)

FOREIGN PATENT DOCUMENTS

| | | |
|---|---|---|
| WO | 0152202 A1 | 7/2001 |
| WO | 2006034584 A1 | 4/2006 |
| WO | 2012143544 A1 | 10/2012 |

OTHER PUBLICATIONS

Akyildiz et al., "Wireless mesh networks: a survey", Computer Networks, vol. 47, No. 4, (2005), p. 445-487.

(Continued)

*Primary Examiner* — Frantzy Poinvil
(74) *Attorney, Agent, or Firm* — Nelson Mullins Riley & Scarborough, LLP

(57) ABSTRACT

A method and system for transmitting data between devices within a fueling environment comprising a wireless mesh network wherein the devices are configured to communicate via the wireless mesh network. A wireless communication device is connected to each device, and a middleware executed by the wireless communication device handles communications between the devices and the wireless mesh network.

13 Claims, 6 Drawing Sheets

(56) References Cited

U.S. PATENT DOCUMENTS

| | | | |
|---|---|---|---|
| 8,538,591 B1* | 9/2013 | Klughart | 700/281 |
| 2002/0070271 A1* | 6/2002 | Terranova et al. | 235/381 |
| 2002/0128988 A1* | 9/2002 | Covington et al. | 705/413 |
| 2003/0025600 A1 | 2/2003 | Blanchard | |
| 2003/0159752 A1 | 8/2003 | Lewis | |
| 2004/0054816 A1 | 3/2004 | Carapelli | |
| 2005/0010797 A1* | 1/2005 | Rushworth | 713/200 |
| 2005/0126265 A1* | 6/2005 | Herzog et al. | 73/49.2 |
| 2006/0012479 A1* | 1/2006 | Ezra | 340/572.1 |
| 2006/0106490 A1 | 5/2006 | Howell et al. | |
| 2006/0243345 A1* | 11/2006 | Lease | 141/95 |
| 2008/0103980 A1 | 5/2008 | Finley et al. | |
| 2008/0251153 A1* | 10/2008 | Bell et al. | 141/198 |
| 2008/0300046 A1 | 12/2008 | Gagner et al. | |
| 2011/0022472 A1 | 1/2011 | Zon | |
| 2011/0057815 A1 | 3/2011 | King et al. | |

OTHER PUBLICATIONS

International Search Report and Written Opinion mailed on Jul. 25, 2012 by the European Patent Office as the International Searching Authority for co-pending international application No. PCT/EP2012/057337.

"ZigBee Certification Program," PowerPoint presentation printout dated Dec. 8, 2005.

"ZigBee Tutorial—Wireless Sensors and Control Networks: Enabling New Opportunities" PowerPoint presentation printout dated Nov. 2005.

"Bet Verso un Mondo interattivo: RFID e sensori ovunque: Le reti ad hoc di smart microdevices" PowerPoint presentation printout dated Mar. 31, 2005.

"Crossbow's New ZigBee-Ready, 802.15.4 Radio-Compliant MICAz Mote and Instant Hit: Mote Enables Audio, Video and Other High Bandwidth Data Collection and Transmission Over a Battery-Powered, Wireless ad-Hoc Mesh Networking Platform" press release dated Aug. 18, 2004.

ZigBee Alliance "ZigBee Architecture Overview" PowerPoint printout dated Dec. 2005.

"Zigbee: "Wireless Control That Simply Works"," report by William C. Craig, Program Manager Wireless Communications, ZMD America, Inc., published 2004.

ZigBee Alliance "Introduction to the ZigBee Application Framework" PowerPoint printout dated Dec. 8, 2005.

ZigBee Alliance "Network Layer Overview" PowerPoint printout dated Dec. 8, 2005.

European Commission "Atex Guidelines: Guidelines on the Application of Directive 94/9/EC of the European Parliament and the Council of Mar. 23, 1994 on the Approximation of the Laws of the Member States Concerning Equipment and Protective Systems Intended for Use in Potentially Explosive Atmospheres," 3rd Edition dated Jun. 2009.

"Directive 94/9/EC of the European Parliament and the Council of Mar. 23, 1994 on the approximation of the laws of the Member States concerning equipment and protective systems intended for use in potentially explosive atmospheres" published in the "Official Journal of the European Communities" on Apr. 19, 1994.

Response to Rule 161 and 162 EPC communication submitted May 28, 2014 with the European Patent Office in application No. EP12720451.9.

* cited by examiner

FUELING ENVIRONMENT WIRELESS ARCHITECTURE

PRIORITY CLAIM

This application claims the benefit of provisional application Ser. No. 61/477,918, filed Apr. 21, 2011 and provisional application Ser. No. 61/541,548, filed Sep. 30, 2011, both of which are hereby relied upon and incorporated herein by reference for all purposes.

FIELD OF THE INVENTION

The present invention relates generally to fueling environments. More particularly, the present invention relates to a system and method for wireless communication between devices in a retail fueling environment.

BACKGROUND OF THE INVENTION

Certain retail fueling environments have incorporated wireless fidelity ("Wi-Fi") technology to enable devices within the fueling environments to communicate. A Wi-Fi access point is installed in a central location within the fueling environment, and each device is equipped with a Wi-Fi network adapter configured to communicate with the Wi-Fi access point. The Wi-Fi network adapter transmits data from the associated device to the Wi-Fi access point, which routes the data to the intended recipient device. Incorporating a Wi-Fi access point and network adapters configured to communicate with the access point into a fueling environment can incur a relatively substantial cost depending on the number of devices in the environment configured to communicate wirelessly. Additionally, not all devices in the fueling environment may be configured to communicate with a Wi-Fi network adapter.

Moreover, Wi-Fi communications are susceptible to interference and degradation caused by the surrounding environment or objects located or positioned within the environment. For instance, objects consisting of substantial amounts of liquid and/or metal can interfere with or even absorb the radio signals transmitted by the Wi-Fi devices. As a result, transmissions from the Wi-Fi network adapters may fail to reach the Wi-Fi access point and/or the intended recipient of the data. That is, a Wi-Fi network adapter and the associated access point are unable to communicate if the path between the two becomes interrupted.

A repeater may be positioned to receive and "repeat" data transmitted by a Wi-Fi network adapter to the access point. In such a scenario, the Wi-Fi network adapter is configured to communicate directly with the repeater, which is configured to communicate directly with the access point. However, the Wi-Fi communications of the system remain susceptible to the interference, degradation, and failure described above. For instance, if either of the paths between the adapter and the repeater or between the repeater and the access point is interrupted, the device is unable to communicate with the intended recipient.

SUMMARY OF THE INVENTION

According to one aspect, the present invention provides a retail fueling environment comprising a plurality of fuel dispensers located in a forecourt area of the fueling environment. A central controller is operative to communicate with a remote payment authorization system to authorize payment of fueling transactions. The fuel dispensers and the central controller have a respective wireless communication device associated therewith such that the fuel dispensers can communicate with the central controller via wireless transmission. Each of the wireless communication devices implements a middleware program such that the wireless communication devices serve as nodes in a wireless mesh network wherein communication between the fuel dispensers and the central controller can occur via alternative transmission paths depending on current conditions in the fueling environment.

In exemplary embodiments, the retail fueling environment may further comprise at least one fuel storage tank having a fuel level sensor associated therewith. A further wireless communication device is associated with the fuel level sensor and also serves as one of the nodes in the wireless mesh network. In addition, at least one of a vending machine and a surveillance camera may be provided in the fueling environment. The vending machine and/or surveillance camera has a respective wireless communication device also serving as a node in the wireless mesh network.

One or more repeater nodes may also be provided. Moreover, communications within the wireless mesh network may be encrypted. The wireless communication devices may further implement a conversion program that allows communication between the middleware and a legacy communication of the fuel dispensers.

A further aspect of the present invention provides a handheld device for use in a retail fueling environment. The handheld device comprises a housing and a touchscreen display. Circuitry located within the housing includes a processor implementing a graphical user interface on the touchscreen display. The circuitry further includes wireless communication circuitry implementing a middleware program such that the handheld device functions as a node in a wireless mesh network in the retail fueling environment.

According some embodiments, the processor allows the handheld device to control operation of at least one fuel dispenser in the retail fueling environment via the wireless mesh network. In addition, the handheld device may further comprise an RFID reader for reading an RFID associated with the fuel dispenser(s). The handheld device may also be configured such that real-time fueling information is shown on the touchscreen display during a fueling transaction at the fuel dispenser.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
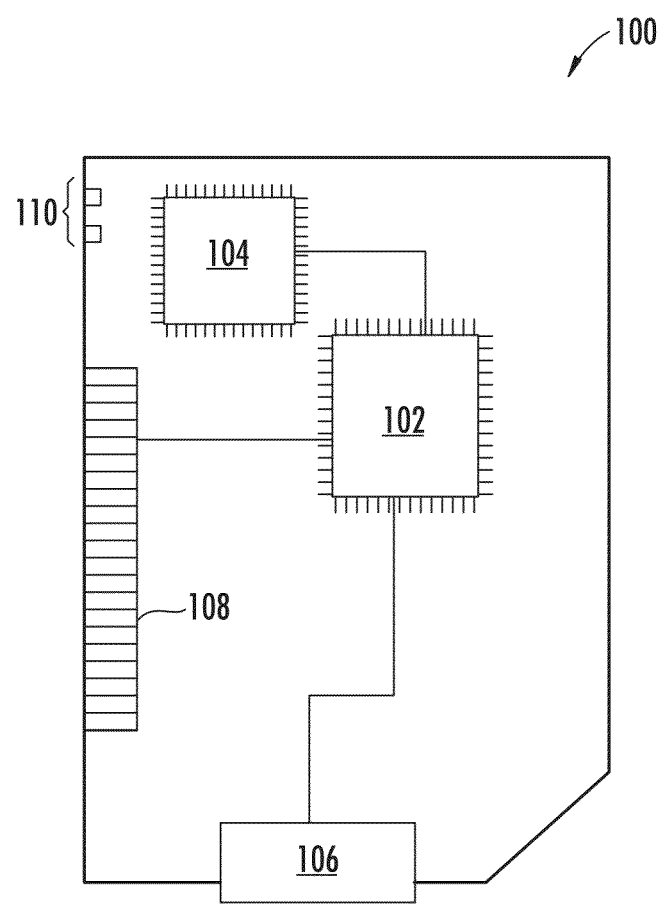
FIG. 1 is a schematic representation of a wireless communication device in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 is a schematic representation of a wireless communication device 100. Wireless communication device 100 comprises a processing device 102, memory 104, a transceiver 106, input-output connections ("I/O") 108, and power connections 110. Processing device 102 is operatively connected to memory 104, transceiver 106, and I/O 108. Wireless communication device 100 may be any suitable device capable of communicating within a wireless mesh network, as explained in more detail below, such as those manufactured by Crossbow Technology Inc. of San Jose, Calif., Ember Corporation of Boston, Mass., the BM Group of Milan, Italy, or Telegesis Limited of Bucks, United Kingdom.

Processing device 102 may be a processor, microprocessor, controller, or other appropriate circuitry, but is preferably sized to minimize the size of wireless communication device 100. Memory 104 may be any type of memory or computer-readable medium that is capable of being accessed by processing device 102. For instance, memory 104 may be random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. In the current embodiment, memory 104 is preferably EPROM in order to minimize the size of wireless communication device 100. Processing device 102 may also include a portion of memory accessible only to the processing device, commonly referred to as "cache." Thus, memory 104 may be part of processing device 102, may be separate, or may be split between the relevant processing device and a separate memory device.

Memory 104 comprises computer-executable program code or instructions that, when executed by processing device 102, initiates a middleware program that handles communication by the wireless communication device as described below. Memory 104 may also comprise one or more data structures for storing information, such as a database or a table. The computer-executable program code or instructions in this scenario, as should be known to those skilled in the art, usually include one or more application programs, other program modules, program data, firmware, and/or an operating system.

Transceiver 106 includes an internal radio frequency ("RF") antenna configured to send and receive RF signals. Transceiver 106 incorporates data provided by processing device 102 into the RF signals transmitted by the antenna, which is typically accomplished by modulating a carrier signal, as should be understood in the art. Transceiver 106 is also configured to extract and transmit to processing device 102 data contained in the RF signals received by the antenna. For simplicity, RF signals and the data contained therein that are transmitted or received by transceiver 106 are referred to herein as being transmitted or received by wireless communication device 100.

I/O 108 provides the ability for wireless communication device 100 to electrically connect to another device or component in order to communicate and transfer data with the other device. I/O 108 is configured to transmit data from processing device 102 to the other device and to transmit data received from the other device to the processing device. Data transmitted or received by I/O 108 is referred to herein as being transmitted or received by wireless communication device 100. The middleware program stored in memory 104 and executed by processing device 102 manages the communication and processing of all data transmitted and received by the wireless communication device.

Power connections 110 are configured to provide power to wireless communication device 100. In one embodiment, power connections 110 are configured to operatively connect to a power source external to wireless communication device 100, such as a solar panel, as explained below. It should be understood, however, that other external powers sources may be used. For example, in a scenario where wireless communication device 100 is coupled to another device, power connections 110 may be electrically coupled to the device's power supply. Alternatively, wireless communication device 100 may include an internal battery coupled to power connections 110 in order to provide power to the device. The battery may be rechargeable, which may be accomplished via an external power supply that connects directly to power connections 110 or indirectly via I/O 108, as explained below. Alternatively, the battery may be recharged via induction by placing power connections 110 adjacent to an inductive charging station.

Figure 2:
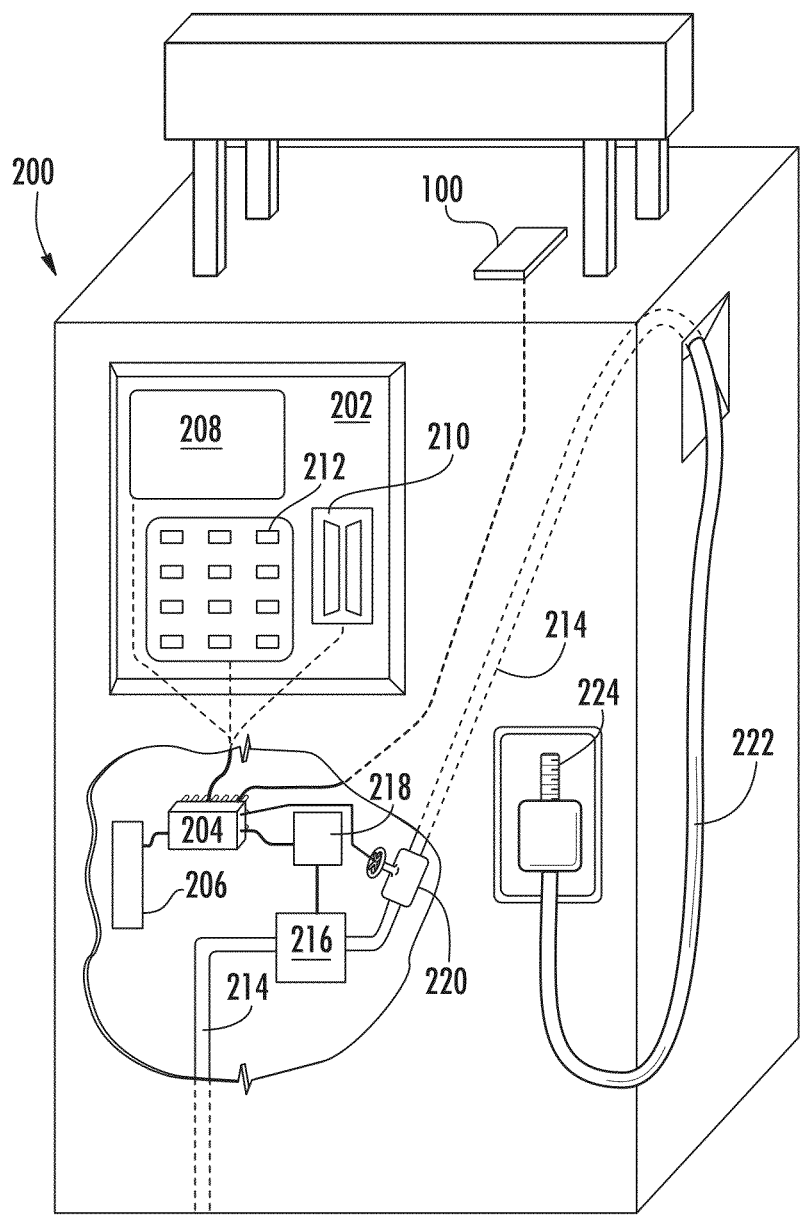
FIG. 2 is a partially schematic, perspective view of a fuel dispenser in accordance with an embodiment of the present invention.

FIG. 2 is a partially schematic perspective view of a fuel dispenser 200 comprising a user interface 202, a processing device 204, and memory 206. User interface 202 includes a display 208, a card reader 210, and a numeric pad 212. Processing device 204 is operatively connected to memory 206, as well as the components of user interface 202, including display 208, card reader 210, and numeric pad 212. User interface 202 may comprise other components operatively connected to processing device 204, such as a smart card reader, a cash acceptor, and/or a receipt printer, as should be understood in the art. Fuel dispenser 200 additionally comprises wireless communication device 100, which is operatively connected to processing device 204. That is, an electrical communication path exists between I/O 108 (FIG. 1) of wireless communication device 100 and processing device 204.

Processing device 204 may be a processor, microprocessor, controller, microcontroller, or other appropriate circuitry. For example, multiple electronic devices configured to operate together within fuel dispenser 200 may be considered a "processing device." Memory 206 may be any type of memory or computer-readable medium that is capable of being accessed by processing device 204, including the examples set forth above with respect to memory 104 of FIG. 1. Memory 206 comprises computer-executable program code or instructions that, when executed by processing device 204, control the components of fuel dispenser 200 including user interface 202 to perform certain tasks and processes as described in more detail below.

As should be understood by those of ordinary skill in the art, fuel dispenser 200 also includes various components configured to facilitate the delivery of fuel to a vehicle. For instance, fuel dispenser 200 additionally comprises a piping network 214 in fluid communication with at least one underground storage tank ("UST"), a meter 216, a pulser 218, a valve 220, a hose 222, and a nozzle 224. Processing device 204 is operatively connected to one or more of these components, such as pulser 218 and valve 220, in order to control their operation and to manage the delivery of fuel by fuel dispenser 200.

User interface 202 is configured to facilitate the dispensing of fuel and the acceptance of payment for the dispensed fuel, as should be understood in the art. For instance, display 208 is configured to provide instructions to a customer regarding the fueling process, while card reader 210 and numeric pad 212 are configured to accept payment card information provided by the customer. That is, card reader 210 is configured to receive payment card data from a magnetic stripe card, such as a credit or debit card, that is swiped or inserted into the card reader. Numeric pad 212 is configured to receive information from a customer associated with the swiped card, such as a personal identification number ("PIN") of a debit card or the billing zip code of a credit card. If included within user interface 202, other devices are configured to facilitate financial transactions for payment of the dispensed fuel. For instance, the smart card reader is configured to handle transactions involving the use of smart cards, while the cash acceptor is configured to handle transactions involving cash payments. The receipt printer is configured to print a receipt upon completion of a fueling process, as described below. Processing device 204 is configured to handle the communication and processing of all data transmitted to and received from the components of user interface 202.

It should be understood that user interface 202 may also be configured to exchange information with a customer unrelated to the fueling transaction. For instance, display 208 may be configured to provide advertisements or other information to the customer, such as that regarding nearby hotels and restaurants. Numeric pad 212 may be configured to receive a selection from the customer regarding the displayed information, such as whether the customer is interested in nearby amenities.

Wireless communication device 100 is configured to enable fuel dispenser 200 to communicate with a wireless mesh network, as explained below. Preferably, wireless communication device 100 handles the communication of data transmitted to and from fuel dispenser 200. Processing device 204 is configured to transmit data to and receive data from wireless communication device 100 via the electrical communication path connecting the processing device and the wireless communication device. Accordingly, data transmitted and received by wireless communication device 100 via the wireless mesh network is referred to herein as being transmitted and received by fuel dispenser 200 for purposes of the following explanation.

Figure 3:
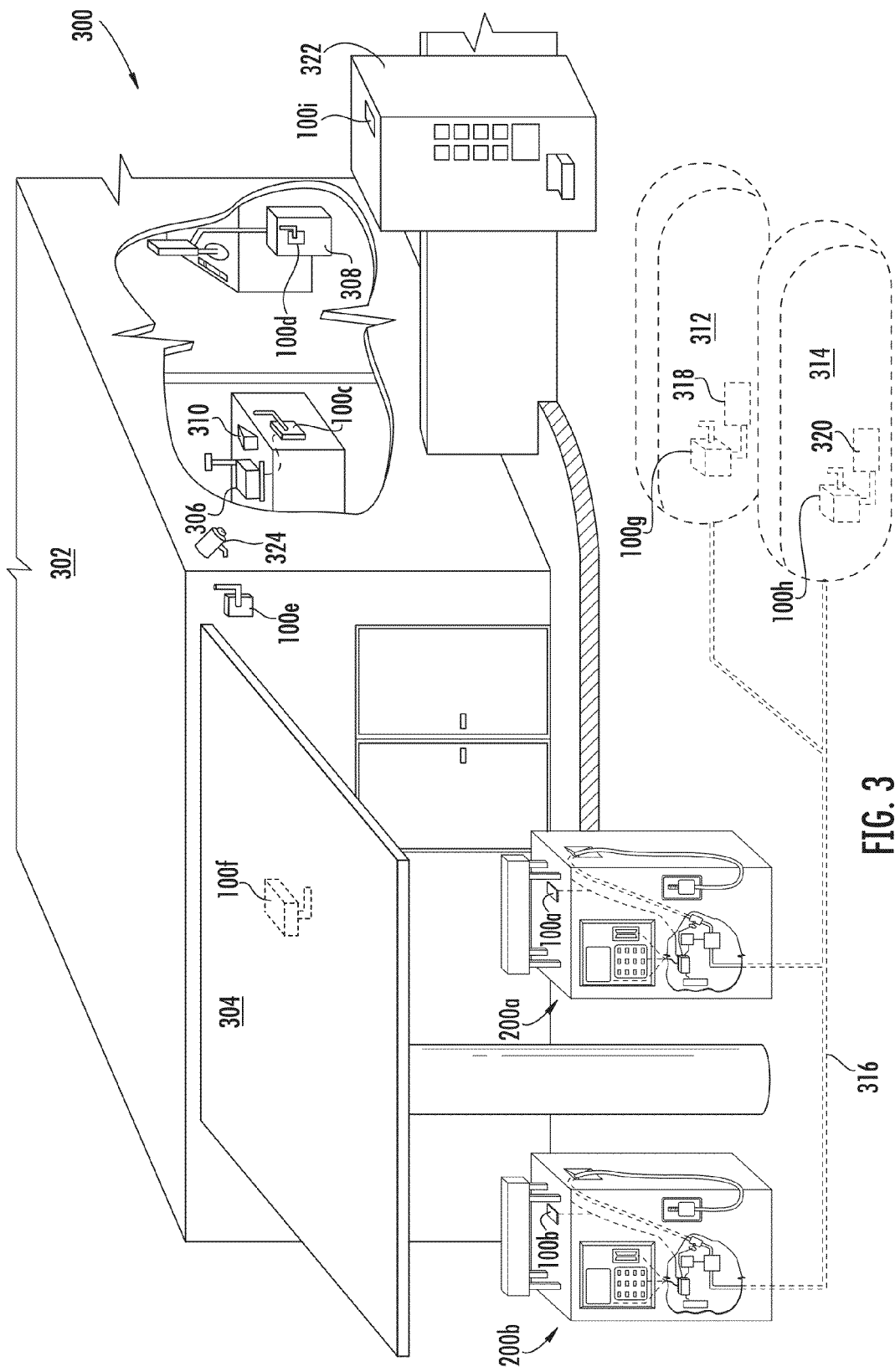
FIG. 3 is a partially schematic, perspective view of a fueling environment in accordance with an embodiment of the present invention.

FIG. 3 is a perspective view of a fueling environment 300 adapted to provide fuel to a customer and to accept payment for the dispensed fuel. Fueling environment 300 comprises at least one fuel dispenser 200a located in a forecourt region of the fueling environment, and a central facility 302. Typically, one or more additional fuel dispensers, such as fuel dispenser 200b, may also be located in fueling environment 300. The fuel dispensers of fueling environment 300 are preferably similar in construction and operation to fuel dispenser 200 of FIG. 2. Fuel dispensers 200a and 200b comprise wireless communication devices 100a and 100b, respectively. In the presently-described embodiment, fueling environment 300 also includes a canopy structure 304 connected to central facility 302 that provides shelter to fuel dispensers 200a and 200b, as should be understood in the art.

Central facility 302 comprises a point-of-sale device ("POS") 306 and a site controller 308 and may include additional computers, such as cashier and/or manager workstations. It should be understood that the functionality of POS 306, site controller 308, and any additional computers within central facility 302 may be incorporated into a single computer or server. In the embodiment illustrated, POS 306 comprises an associated card reader and payment terminal 310. Each of POS 306 and site controller 308 may also include a display, a touch screen, and/or other input devices.

In one embodiment, POS 306 and site controller 308 are operatively connected to a local area network ("LAN") via a wired or wireless connection, as should be understood in the art. A device typically located within central facility 302 is operatively connected to the LAN and to a wide area network ("WAN"), such as the Internet. The device facilitates communication of the other devices connected to the LAN, as well as communication with devices external to fueling environment 300 that are connected to the WAN, as should also be understood. In one embodiment, the device is a standalone router, switch, or gateway, although it should be understood that either POS 306 or site controller 308 may additionally perform the functions of, and therefore replace, such a device.

In another embodiment, POS 306 and site controller 308 are operatively connected to wireless communication devices 100c and 100d, respectively, as illustrated in FIG. 1 and explained in more detail below. Alternatively, each of POS 306 and site controller 308 may be connected to the LAN, an associated wireless communication device, or both.

As is well-known, at least one server external to fueling environment 300 and maintained by a third-party, such as a financial institution, is connected to the WAN. It should be understood that fueling environment 300 may be operatively connected via the WAN to several servers maintained by various financial institutions in order to carry out financial transactions involving customer accounts maintained by the different financial institutions.

Fueling environment 300 may additionally comprise one or more standalone wireless communication devices, such as wireless communication devices 100e and 100f. In one embodiment, wireless communication device 100f is attached to the underside of canopy structure 304. A solar panel may be attached to the top surface of canopy structure 304 and connected to wireless communication device 100f in order to provide a source of power to the wireless communication device.

As should be understood in the art, fueling environment 300 additionally comprises components necessary for delivering fuel to customers' vehicles. For example, fueling environment 300 comprises one or more USTs, such as tanks 312 and 314. USTs 312 and 314 are in fluid communication with dispensers 200a and 200b via an underground piping network 316 and the dispensers' piping networks 214 (FIG. 2). Each of USTs 312 and 314 are connected to at least one sensor, such as respective sensors 318 and 320, in order to measure and/or determine certain characteristics of the UST, including the volume of fuel and the pressure within the respective UST. Wireless communication devices 100g and 100h are operatively connected to sensors 318 and 320, respectively.

Fueling environment 300 may comprise other components, such as lights, air conditioning units, security systems, car wash equipment, and vending machines. A wireless communication device may be operatively connected to each such component in order to enable the component to communicate via the fueling environment's wireless mesh network as explained in more detail below. Fueling environment 300, for example, further comprises a vending machine 322, which is operatively connected to a wireless communication device 100i. In this example, fueling environment 300 also comprises a surveillance camera 324, which may be operatively connected to a security system, the LAN, a wireless communication device, such as device 100e, or any combination thereof.

Each wireless communication device connected to a device within fueling environment 300 is operatively connected to that device's processing device in a manner similar to that described above with respect to processing device 204 and wireless communication device 100 of fuel dispenser 200 illustrated in FIG. 2. Likewise, the wireless communication device is configured to enable the associated device to communicate with a wireless mesh network, as explained below. Accordingly, data transmitted and received by the wireless communication device via the wireless mesh network is referred to herein as being transmitted and received by the respective device for purposes of the following explanation. For instance, data output by vending machine 322 to the wireless mesh network via wireless communication device 100i is referred to herein as being transmitted by the vending machine. Additionally, the wireless communication devices located within fueling environment 300 are similar in construction and operation to wireless communication device 100 of FIG. 1. However, it should be understood that while the middleware of each wireless communication device is identical, it provides differing functionality depending on the type of device to which the respective wireless communication device is connected. For example, the middleware of wireless communication devices 100a and 100b is configured to provide functionality corresponding to transactions carried out by fuel dispensers 200a and 200b, while the middleware of wireless communication devices 100g and 100h is configured to provide functionality corresponding to the measurements taken by sensors 318 and 320.

The wireless communication devices of fueling environment 300 create a wireless mesh network in order to enable the devices within the environment to communicate. Each wireless communication device is considered to be a node in the wireless mesh network and configured to communicate with any other node in the wireless mesh network. That is, each wireless communication device is configured to receive, handle, and transmit data over the wireless mesh network. Examples of suitable wireless mesh networks are those adhering to the IEEE 802.15.4-2006 standard, including the ZigBee and MiWi specifications, all of which are incorporated by reference for all purposes as if set forth verbatim herein.

It should be understood that the wireless communication devices of fueling environment 300 are relatively small, inexpensive, and consume a relatively small amount of power when operating. As a result, the wireless communication devices may be placed throughout fueling environment 300 and connected to various power supplies in order to create a consistent and reliable wireless mesh network. The transmission range for each node is approximately 15 to 100 meters or 50 to 330 feet, depending on the type of wireless communication device used. It should be further understood that nodes are installed and located within fueling environment 300 so that any radio signal transmitted from defined locations within the environment will be received by the wireless mesh network. For instance, wireless communication devices that are not connected to a device of fueling environment 300, such as wireless communication device 100f, are configured to merely retransmit any data received via the wireless mesh network. It should be understood that these wireless communication devices increase the coverage of the wireless mesh network.

In one embodiment, one of the wireless communication devices of the wireless mesh network acts as a coordinator. That is, the coordinator maintains information that defines the wireless mesh network and identifies its nodes. The coordinator transmits this information to the other nodes when requested or needed. For instance, the coordinator maintains a table of available nodes connected within the wireless mesh network. The other nodes may be configured to store a copy of this information, after which the coordinator only transmits changes to the configuration of the wireless mesh network, such as the addition or removal of a node to the network. It should be understood that any of the wireless communication devices of fueling environment 300 may be configured to operate as the coordinator.

Based on the information provided by the coordinator, the nodes of the wireless mesh network transmit data via the network in the most efficient manner and path depending on certain characteristics of the transmitting and receiving nodes, such as their respective locations. While a network administrator may configure the manner and paths by which data is transmitted via the wireless mesh network, the wireless mesh network is configured to transmit data using the least number of available nodes by default in the presently-described embodiment. Alternatively, the nodes of the wireless mesh network may be configured to transmit data using table routing or using "ad hoc on demand distance vector routing" ("AODV").

In another embodiment, each node of the wireless mesh network stores a copy of a database or a table comprising information representative of the nodes operatively connected to the network. The information corresponding to the nodes is maintained in real-time so that any changes to the database are populated throughout the network to each node. In this embodiment, the middleware executed by each node is responsible for determining the most efficient manner and path by which data should be transmitted by the node. This may be accomplished by selecting the fewest number of available nodes, by table routing, or by AODV, as set forth above.

The wireless mesh network of fueling environment 300 is configured to be redundant, reliable, and self-healing. That is, if one node becomes inaccessible or unavailable for any reason, such as due to the placement of a large metal object adjacent the node, the wireless mesh network routes data via the network using the other available nodes. For example, data output by fuel dispenser 200b to site controller 308 may be transmitted via the wireless mesh network from wireless communication device 100b to wireless communication device 100d via wireless communication device 100f and/or 100e should devices 100b and 100d be unable to communicate directly. If a communication path using wireless communication device 100f and/or 100e is unavailable, wireless communication device 100b may communicate with wireless communication device 100d via one or more of wireless communication devices 100a, 100h, 100g, and 100i. It should be understood that the middleware of each wireless communication device determines the best communication path to the intended recipient upon receiving data regardless of the path by which the data was delivered to the node.

In one embodiment, a node sending data via the wireless mesh network attaches a header to the data that provides information about the recipient node. The header may be configured to include data corresponding to the transmitting node as well. Any intermediate node receiving the transmission identifies the intended recipient node from the data contained in the header. It is possible for the node to receive the data from several nodes depending on the configuration of the wireless mesh network. The node determines the manner by which the data should be transmitted based on the identification of the destination contained in the header. In one embodiment, the node uses the information contained in the header to determine if it has already received the data. If so, the receiving node discards any additional copies of the data it receives.

In another embodiment, a node transmitting data via the wireless mesh network includes an acknowledgement request in the data. The request directs a node that receives the request to return an acknowledgement letting the node sending the transmission know that it has been received. Upon receipt of the acknowledgement, the sending node ceases transmitting the data. Each node that receives the data returns such an acknowledgement to the node from which the data was received.

In yet another embodiment, a checksum is transmitted along with the data to enable any recipient nodes to determine whether the entire set of data was received. If not, the recipient node informs the sending node to retransmit the data. This process repeats itself until the receiving node verifies that it has received the entire set of data using the checksum.

Referring to FIGS. 2 and 3, in operation, a customer positions his vehicle adjacent to fuel dispenser 200a to initiate the fueling process. Display 208 presents instructions to the customer as to the manner by which to begin the process, which may instruct the customer to swipe a credit or debit card using card reader 210. In this example, the customer swipes a debit card using card reader 210 and provides his PIN to dispenser 200a using numeric keypad 212. In order to determine whether to authorize the fueling process, fuel dispenser 200a transmits at least a portion of the payment card data received from the customer to site controller 308 via the wireless mesh network. That is, wireless communication device 100a transmits the data to wireless communication device 100d via the wireless mesh network.

Site controller 308 transmits at least a portion of the information received from fuel dispenser 200a to the server of the financial institution connected to the WAN that maintains the account corresponding to the card supplied by the customer. The financial institution either authorizes or denies the transaction based on the transmitted information and returns data representative of the decision to site controller 308. Site controller 308 transmits data indicating whether the financial institution authorized the fueling transaction to fuel dispenser 200a via the wireless mesh network.

If fuel dispenser 200a receives an authorization from site controller 308, processing device 204 instructs valve 220 to open in order to allow the flow of fuel. When the customer activates nozzle 224 and valve 220 is open, fuel flows from at least one of USTs 312 and 314 to piping network 214 (FIG. 2) of fuel dispenser 200a via underground piping network 316. Meter 216 measures the flow of fuel as it flows through the meter, while pulser 218 transmits a signal to processing device 204 representative of the measurement.

Upon completion of the fueling process, fuel dispenser 200a transmits data to site controller 308 via the wireless mesh network, such as the amount of fuel delivered to the customer's vehicle. Site controller 308 then transmits at least a portion of the data to the applicable financial institution via the WAN in order to complete the transaction. The financial institution performs any necessary tasks which may include debiting the customer's account, as is well-known in the art. Additionally, site controller 308 may transmit data to fuel dispenser 200a via the wireless mesh network in order to complete any ancillary tasks associated with the fueling process (such as printing a receipt at the dispenser) for the customer if desired.

Other wireless communication devices of fueling environment 300 are configured to handle communication of data representative of information received from the device to which the respective wireless communication device is connected. For example, wireless communication devices 100g and 100h transmit data representative of information received from sensors 318 and 320, respectively, regarding the fuel contained in respective USTs 312 and 314. In one embodiment, sensor 318 constantly measures the volume of fuel contained in tank 312 and outputs data representative of the measurements to wireless communication device 100g. Wireless communication device 100g transmits the data to wireless communication device 100d of site controller 308 via the wireless mesh network.

By way of another example, sensor 320 monitors UST 314 to detect any malfunction by the tank or parts associated therewith. If a malfunction is detected, sensor 320 outputs data representative of the malfunction to wireless communication device 100h, which transmits the data to site controller 308 via the wireless mesh network in order to be handled appropriately. Additionally, camera 324 may be configured to output data, which may include video footage filmed and streamed by the camera. In such an embodiment, camera 324 outputs the data to wireless communication device 100e which transmits the data via the wireless mesh network.

In another embodiment, one of the wireless communication devices of the fueling environment is configured to connect directly to the WAN or indirectly to it by being operatively connected to the LAN directly. The wireless communication device handles communications between the wireless mesh network and resources connected to the WAN that are external to fueling environment 300. For example, wireless communication device 100e may be configured to connect to the WAN directly and function as a gateway. In such an embodiment, wireless communication device 100e is referred to as gateway 100e. Gateway 100e continues to function as a node in the wireless mesh network. That is, gateway 100e continues to send and receive data via the wireless mesh network, such as the data transmitted by fuel dispenser 200a and intended for site controller 308. Gateway 100e is also configured to route information to any wireless communication device that has requested information from remote devices located on the WAN in a manner similar to a router or gateway.

For example, wireless communication device 100i may be configured to transmit data representative of information provided by vending machine 322 via the wireless mesh network to a resource external to fueling environment 300 and connected to the WAN. In one embodiment, vending machine 322 is configured to output data representative of the vending machine's usage to a server connected to the WAN and associated with the vending machine operator. The vending machine's processing device outputs this data to wireless communication device 100i, which transmits the data to gateway 100e via the wireless mesh network. Gateway 100e transmits the data to the remote server via the WAN. Gateway 100e transmits any data returned from the server and intended for vending machine 322 to wireless communication device 100i via the wireless mesh network.

In another embodiment, vending machine 322 is configured to transmit a notification to the external server when its inventory drops below a predetermined amount. In a manner similar to that described above, wireless communication device 100i transmits the notification to the server via the wireless mesh network, gateway 100e, and the WAN.

In another embodiment, fuel dispensers 200a and 200b are configured to handle the financial transactions for the fuel provided by the dispensers. In this embodiment, fuel dispensers 200 are configured to communicate directly with the financial institution rather than sending financial information to site controller 308 to be communicated to the financial institution. Fuel dispensers 200a and 200b transmit payment card data to gateway 100e via the wireless mesh network, which transmits the data to the financial institution via the WAN. Any data returned by the financial institution is routed by gateway 100e to the fuel dispensers via the wireless mesh network. The process then continues in a manner similar to that described above.

It should be understood that fuel dispensers 200a and 200b may continue to transmit data representative of the transactions carried out by the dispensers to site controller 308 for reporting or other purposes in the presently-described embodiment. In fact, fueling environment 300 may be configured so that only non-sensitive/confidential payment information is transmitted to site controller 308. As a result, site controller 308 would not be required to comply with certain security requirements. An example of such a fueling environment is described in copending U.S. patent application Ser. No. 12/689,983 entitled "Payment Processing System for Use in a Retail Environment Having Segmented Architecture," the entire disclosure of which is hereby incorporated by reference for all purposes as if set forth verbatim herein.

In one embodiment, the wireless communication devices are configured to encrypt data transmitted by the devices and decrypt data received by the devices. The wireless communication devices may utilize the 128-bit Advanced Encryption Standard ("AES"), although it should be understood that other suitable encryption standards and schemes may be used. It should also be understood that the wireless communication devices may be configured to encrypt only sensitive or confidential data rather than any data transmitted by the device. In such an embodiment, the devices' middleware is preconfigured to determine what data should be encrypted prior to transmission.

Referring to FIGS. 1 and 3, in another embodiment, memory 104 of each wireless communication device comprises computer-executable program code or instructions that, when executed by processing device 102, executes a conversion component that handles communication between legacy or non-standard devices and the middleware. That is, the conversion component enables the middleware and devices to communicate that are not natively configured to communicate with one another. For instance, a fuel dispenser that has been in service for a relatively extended amount of time may not be configured to natively communicate with the middleware described above. Instead, the fuel dispenser may be configured to send and receive data using only two wires or via a serial port, such as one configured to use the RS232 standard. The communication output apparatus of the device, such as the two wires or an RS232 serial port, is operatively connected to I/O 108 of wireless communication device 100 in a manner similar to that described above with respect to the electrical communication path between processing device 204 and wireless communication device 100 of FIG. 2.

The conversion component stored within memory 104 and executed by processing device 102 manages communication between the legacy device and wireless communication device 100. In this example, for instance, the conversion component interprets any data transmitted via the dispenser's wires into data that can be used by the middleware. The conversion component then outputs the data in a format understood by the middleware. Additionally, the conversion component translates instructions or commands directed to the legacy or non-standard device from the middleware into commands understood by the device. For example, the conversion component converts an authorization received by wireless communication device 100 into one or more signals recognized by the dispenser as an authorization. The conversion component then outputs the authorization to the dispenser using the two wires, serial port, or any other suitable data connection. In this manner, the conversion component enables devices and the middleware to communicate when they are not natively configured to do so. As a result, legacy or non-standard devices are able to interact with the wireless communication devices and utilize the wireless mesh network.

Figure 5:
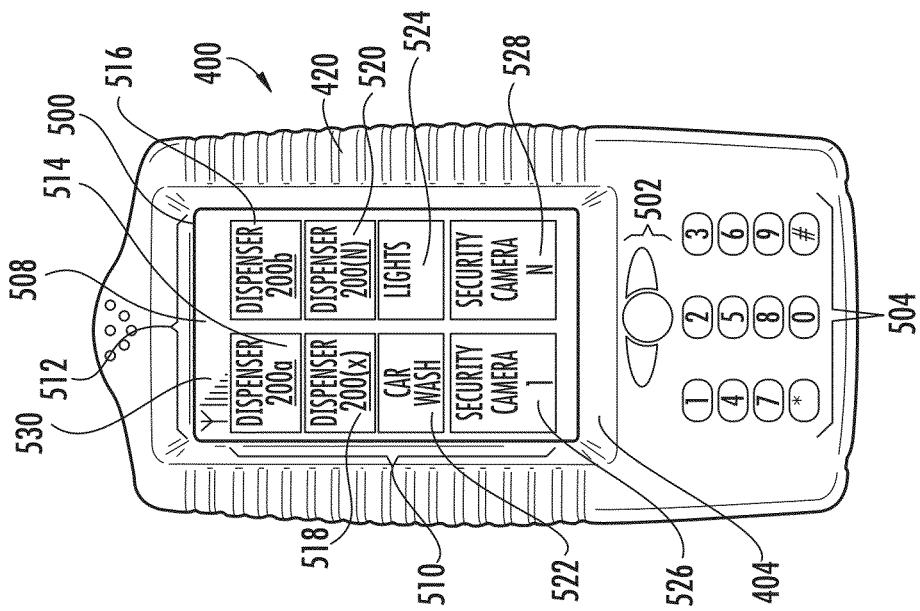
FIG. 5 is a front elevation view of the handheld device of FIG. 4 displaying an exemplary graphical user interface.
Figure 4:
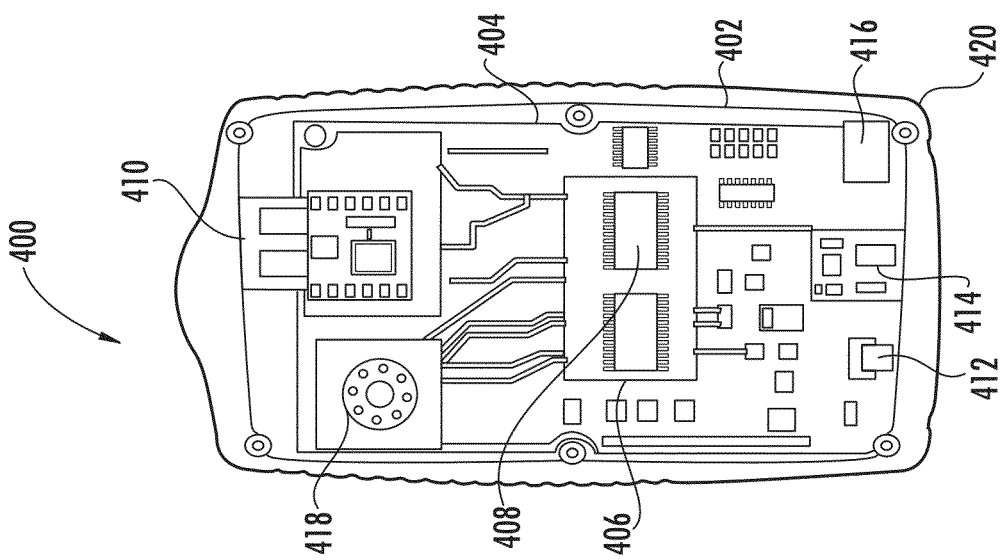
FIG. 4 is a partially schematic, cross-sectional representation of the internal components of a handheld device in accordance with an embodiment of the present invention.

FIGS. 4 and 5 illustrate an exemplary handheld device 400 configured to interact within the fueling environment. FIG. 4 is a partially schematic, cross-sectional representation of the internal components of handheld device 400, while FIG. 5 is a front elevation view of the handheld device. Referring to FIG. 4, handheld device 400 comprises an enclosure 402 defining an internal area that includes a circuit board 404. Circuit board 404 comprises a processing device 406, memory 408, a transceiver 410, and a data connection 412. Handheld may comprise additional components, such as a memory slot 414, a vibration unit 416, and a speaker 418. Those of ordinary skill in the art should understand that other components may be included within handheld device 400 as desired or needed, such as a microphone as explained below. Processing device 406, memory 408, and transceiver 410 are similar in construction and operation to processing device 102, memory 104, and transceiver 106, respectively, of wireless communication device 100 described above with respect to FIG. 1. Accordingly, data transmitted by processing device 406 to transceiver 410, which modulates a carrier signal to contain the data and transmits the resulting RF signal, is referred to as being transmitted by handheld device 400. Likewise, data contained in RF signals received by transceiver 410 and transmitted to processing device 406 for handling is referred to herein as being received by handheld device 400. In this embodiment, processing device 406 is also operatively connected to memory slot 414, vibration unit 416, and speaker 418.

Enclosure 402 is encased in a housing cover 420 preferably constructed from a plastic or rubberized material in order to protect handheld device 400 in the event it is dropped or from other shocks caused by unexpected impacts. Rubberized housing cover 420 also prevents the creation of sparks should the handheld device be dropped or come into contact with metal. Additionally, rubberized cover 420 is preferably constructed from an anti-static material in order to prevent the buildup of electrical energy. Enclosure 402 is preferably an airtight enclosure such that circuit board 404 located within the enclosure is shielded from external factors, and the housing's interior is separated from the environment. For example, any electrical occurrence or discharge, such as a spark produced by circuit board 404, is contained within handheld device 400. As a result, such an airtight, anti-shock, antistatic handheld device is preferably in compliance with the applicable "Atmospheres Explosibles," or "ATEX," Directives.

Data connection 412 is an I/O connection that allows data to be transmitted to processing device 406 via the connection. In one embodiment, data connection 412 is contained within enclosure 402, such that cover 420 must be removed and the enclosure opened in order to gain access to the connection. In another embodiment, enclosure 402 and cover 420 define corresponding apertures through which access to data connection 412 is provided. In such an embodiment, the enclosure 402 may comprise a sealing gasket in order to maintain the enclosure's airtight characteristics. In another embodiment, a portion of cover 420 is configured to seal in place with the rest of the cover over the apertures. That is, cover 420 may be segmented so that the portion covering the apertures may be pulled away from the aperture, thereby providing access to the data connection. Cover 420 is designed such that a sufficient amount of force applied to the portion seals it back in place with the rest of the cover.

In the presently-described embodiment, data connection 412 is a universal serial bus ("USB") port capable of sending and receiving data, as well as receiving power. In one embodiment, data connection 412 is configured to provide a sufficient amount of power in order for handheld device 400 to operate. In another embodiment where handheld device 400 comprises an internal rechargeable battery, data connection 412 may be configured to handle an amount of power sufficient to recharge the battery. Additionally, handheld device 400 may be connected to another computer or server, such as site controller 308, via data connection 412 and a USB cable in order to update the handheld device's firmware, software, and/or GUIs stored in memory 408, to send and receive other data to and from the handheld device, or to recharge the handheld device's internal battery.

Optional memory slot 414 is configured to accept removable memory devices, such as a secure digital device, flash memory, or a memory stick. Memory slot 414 is configured to allow processing device 406 to store data on the removable memory device so that the data may be removed or copied from the handheld device without affecting the device's operation. In one embodiment, processing device 406 is configured to store data representative of logs, images, and various user configurations for handheld device 400, such as the preferences of each operator of the handheld device. Memory slot 414 may also be configured to transmit data stored on removable media to processing device 406. For instance, the firmware stored in memory 408 may be updated with a new version stored on the media inserted into memory slot 414.

Referring to FIG. 5, handheld device 400 further comprises a touch screen 500, soft buttons 502, and numeric pad buttons 504, all of which are operatively connected to processing device 406. Buttons 502 and 504 preferably comprise sealing gaskets in order to maintain the airtight characteristic of enclosure 402 described above. Touch screen 500 is configured to display graphical user interfaces ("GUIs") comprising various buttons and indicia. FIG. 5 illustrates an exemplary GUI 508 comprising a plurality of buttons commonly denoted at 510 and an indication area 512. It should be understood that the GUIs may be configured to display various buttons, icons, indicia, and information. An operator of handheld device 400 interacts with the device using touch screen 500, soft buttons 502, and numeric pad buttons 504. For instance, the operator activates handheld device 400 by depressing one of soft buttons 502 for a selected period of time, while numeric pad buttons 504 may be used to effect financial transactions within fueling environment 300 as described below. The arrangement and operation of several exemplary GUIs presented by touch screen 500 are described in more detail below.

Touch screen 500, vibration unit 416, and speaker 418 may be configured to provide an indication when the handheld receives data. For instance, if data is received by transceiver 410 and/or data connection 412, touch screen 500 may display a visual indication that the data has been received. In another embodiment, processing device 406 instructs vibration unit 416 to vibrate when data is received. In yet another embodiment, speaker 418 is configured to output an audible alert when data is received. It should be understood that handheld device 400 may be configured to output any combination of these alerts when data is received.

In another embodiment, speaker 418 is configured to output audible messages transmitted to handheld device 400 by an administrator or manager from within central facility 302 (FIG. 3) via the wireless mesh network. Additionally, in an embodiment where handheld device 400 comprises a microphone, the speaker and microphone allow the handheld device to be used in an intercom system, thereby allowing a manager inside central facility 302 and operators of the handheld devices to communicate. It should also be understood that the operators of the handheld devices may communicate with one another if desired. Moreover, the touch screen, speaker, and microphone allow handheld device 400 to be used as a mobile communication device, such as a mobile cellular or Internet phone.

In one embodiment, handheld device 400 comprises an internal rechargeable battery configured to supply power to the handheld, similar to that described above with respect to wireless communication device 100 of FIG. 1. The internal battery may be recharged via a connection to an external power supply or to data connection 412 or by induction. Those of ordinary skill in the art should appreciate that an embodiment were the internal battery of handheld device 400 is rechargeable via induction allows enclosure 402 to be manufactured without an opening necessary for the handheld to connect to an external power supply. It should be further appreciated that such an embodiment facilitates maintaining the airtight characteristics of handheld device 400.

Memory 408 of handheld device 400 includes the middleware described above that, when executed by processing device 406, enables handheld device 400 to send and receive data via the wireless mesh network of the fueling environment. Memory 408 additionally comprises computer instructions or code that, when executed by processing device 406, controls the operation of touch screen 500, as well as the handheld device's other components, in order to perform the functions described below. Upon execution of the computer code, for instance, touch screen 500 displays GUI 508 that allows an attendant to interact with the devices within fueling environment 300, such as fuel dispensers 200a and 200b, and to facilitate transactions involving components of the environment.

Figure 6:
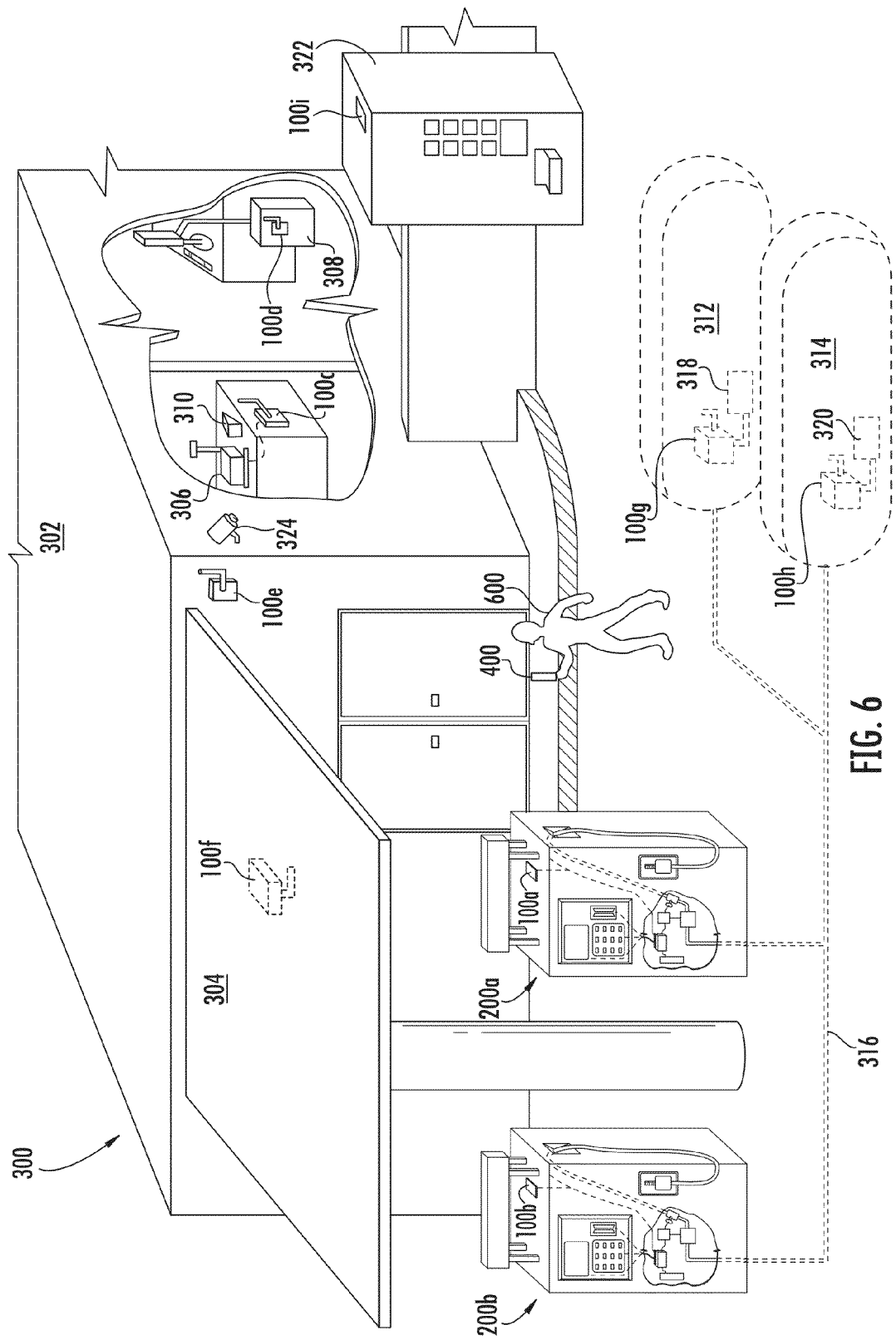
FIG. 6 is a partially schematic, perspective view of a fueling environment in accordance with an embodiment of the present invention.

Referring to FIGS. 4, 5, and 6, for example, GUI 508 provides information about, and displays buttons or indicia representative of, components located within fueling environment 300. In this example, buttons 514, 516, 518, and 520 correspond to the fuel dispensers, button 522 corresponds to a car wash, button 524 corresponds to the lights, and buttons 526 and 528 correspond to the security system of fueling environment 300. GUI 508 may include additional indicia to provide the operator with information, such as wireless indicia 530 that provides an indication of the strength of the radio field of the wireless communication device closest to handheld device 400. It should be understood that GUI 508 may be adapted to display a button for each component in the fueling environment with which the operator may interact, including vending machine 322 and USTs 312 and 314.

Referring to FIGS. 5 and 6, for example, attendant 600 selects the indicia or button representative of the fuel dispenser located adjacent to a customer's vehicle, such as button 514 corresponding to fuel dispenser 200a. Touch screen 500 displays a GUI configured for the component within fueling environment 300 corresponding to the button selected by the operator. The GUI associated with the component provides information to the operator corresponding to the component, as well as the ability to interact with the component. It should be understood that the GUI for each component within fueling environment 300 may be configured specifically for the respective component since each type of component may operate uniquely and perform different functions. For instance, the GUI configured to allow attendant 600 to interact with the fuel dispensers differs from the GUIs configured to allow the operator to interact with the car wash or the security system.

Figure 7:
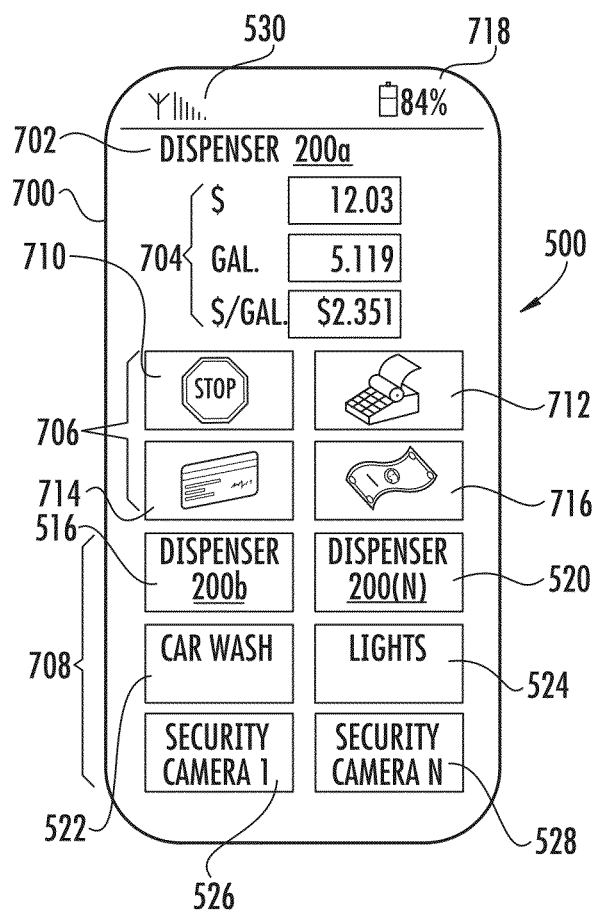
FIG. 7 is another exemplary graphical user interface displayed by the handheld device of FIG. 4.

FIG. 7, for example, illustrates a GUI 700 configured to allow attendant 600 to interact with fuel dispenser 200a. Touch screen 500 displays GUI 700 upon activation by attendant 600 of button 514 of GUI 508 (FIG. 5). GUI 700 comprises a component indication area 702, a component information area 704, an action area 706, and a component selection area 708. Component indication area 702 identifies the component to which the GUI currently displayed by the handheld device corresponds. Component information area 704 provides information received from or related to the component to which the GUI corresponds. Action area 706 displays buttons and/or other indicia that allow the operator to send commands to, instruct, or control the component to which the GUI corresponds. Action area 706 may also include buttons that allow attendant 600 to carry out transactions associated with the fueling environment. Component selection area 708 displays buttons and/or other indicia that allow the operator to select other components within the fueling environment and to display the GUI associated with the selected component. In this example, selection area 708 comprises buttons or action items similar to those presented by GUI 508 (FIG. 5), thereby providing the ability to select and interact with the environment's components other than the one currently selected.

In the presently-described embodiment, component identification area 702 identifies fuel dispenser 200a as the currently-selected component (to which GUI 700 corresponds). Component information area 704 displays information provided by or relevant to fuel dispenser 200a. Such information may include the total value of the volume of fuel that has been or is currently being dispensed, the total volume of fuel that has been or is currently being dispensed, and the price per unit volume of the type of fuel that has been or is currently being dispensed.

In this example, action area 706 comprises a stop button 710, a receipt button 712, a card payment button 714, and a cash payment button 716. Stop button 710 is configured to allow attendant 600 to terminate the current fueling process for any reason if one is in progress. Receipt button 712 is configured to allow attendant 600 to print a customer receipt for the corresponding fueling process. If a fueling process has been completed, card payment button 714 is configured to allow attendant 600 to accept and process a credit or debit card provided by the customer as payment for the dispensed fuel. Cash payment button 716 is configured to allow attendant 600 to accept and process a cash payment received from the customer as payment. It should be understood that action area 706 may comprise additional action items or buttons as needed or desired and that certain buttons or action items may be disabled depending on the current circumstances. For example, buttons 712, 714, and 716 may be inactive or disabled until the current fueling process has been completed or is terminated. It should also be understood that each button or action item may cause handheld device 400 to present additional GUIs. For instance, activation of receipt button 712 may cause handheld device 400 to present a GUI configured to allow attendant 600 to select a specific printer located within the fueling environment to print the receipt should the environment comprise more than one printer. In this embodiment, the indicia area of GUI 700 includes wireless indicia 530, as well as a battery meter indicia 718 that indicates the remaining battery life of the handheld device.

Referring to FIGS. 5, 6, and 7, in operation, a customer positions a vehicle adjacent to fuel dispenser 200a and approaches attendant 600 in order to initiate a fueling transaction involving the dispenser. The customer provides attendant 600 with a form of payment, such as cash or a credit or debit card. Attendant 600 uses handheld device 400 to access GUI 508 displayed by touch screen 500. Attendant 600 selects the button or indicia on the GUI corresponding to the fuel dispenser selected by the customer, which is button 514 corresponding to fuel dispenser 200a in this example.

Attendant 600 then selects the button corresponding to the type of payment provided by the customer, such as button 714 if the customer provided a credit or debit card or button 716 if the customer provided cash as the form of payment. Handheld device 400 is configured to display additional GUIs depending on the button selected by attendant 600. For instance, if attendant 600 selected button 714, handheld device 400 may present a GUI configured to allow the attendant to enter the account number of the credit or debit card and any other necessary information. Alternatively, attendant 600 may utilize numeric pad buttons 504 to enter the account number of the card. The customer may be asked to enter the PIN or billing postal code associated with the account, which may be accomplished via numeric pad buttons 504 or touch screen 500. Alternatively, if attendant 600 selected button 716, handheld device 400 may display a GUI configured to allow the attendant to input the amount of currency provided by the customer using touch screen 500 or numeric pad buttons 504.

Handheld device 400 transmits data representative of the financial information provided by the customer to site controller 308 via the wireless mesh network. As explained above, the middleware executed by processing device 406 determines the best available transmission path from handheld device 400 to site controller 308, which may include wireless communication devices 100f, 100e, and 100c or which may be directly from the handheld device to wireless communication device 100d. Site controller 308 determines whether fuel dispenser 200a should be authorized for use by the customer in a manner similar to that described above. Site controller 308 transmits data representative of the determination to fuel dispenser 200a via the wireless mesh network. The fueling process then proceeds in the manner described above. In one embodiment, fuel dispenser 200a transmits real-time data corresponding to the fueling process via the wireless mesh network to handheld device 400, which is displayed by touch screen 500.

Once the fueling process is complete, fuel dispenser 200a transmits data representative of the completed transaction to site controller 308. Site controller 308 may perform a number of functions, such as storing information corresponding to the transaction in a log or a report, as should be understood in the art. Site controller 308 then transmits at least a portion of the data to handheld device 400 in order to complete the transaction. For example, site controller 308 may transmit data containing the total volume of fuel associated with the transaction and a transaction id. In this example, attendant 600 selects button 712 in order to print a receipt to provide the customer with a record of this information.

In another embodiment, handheld device 400 comprises a card reader, similar to card reader 210 of fuel dispenser 200 (FIG. 2), in order to allow attendant 600 to receive payment card data via a card's magnetic stripe rather than manually entering the account information using touch screen 500 or numeric pad buttons 504. Because card readers are magnetic readers and do not require contact with the card, the airtight characteristics of handheld device 400 are maintained. As a result, handheld device 400 remains compliant with the ATEX Directives.

In this embodiment, the customer provides attendant 600 with a magnetic stripe card, which is swiped using the card reader. Should the customer be required to provide the PIN for the swiped card, the customer may do so using either numeric pad buttons 504 or a GUI comprising a virtual PIN pad presented by touch screen 500. Data representative of the financial information provided by the customer is transmitted by handheld device 400 to site controller 308 via the wireless mesh network. The fueling process continues in a manner similar to that described above.

In another embodiment, handheld device 400 comprises a smart card reader in order to allow attendant 600 to handle transactions involving smart cards. As should be understood in the art, the use of smart cards requires contact between the card and the reader. In order to remain ATEX-compliant, handheld device 400 comprises additional components to prevent any potential electrical discharge when a smart card comes into contact with the smart card reader. For example, handheld device 400 comprises an intrinsic safe barrier ("ISB") operatively connected to the handheld's smart card reader. Those of ordinary skill in the art should understand that an ISB limits the amount of current able to flow through a contact, such as the contact of the smart card reader. As a result, the ISB prevents the creation and discharge of electrical energy due to the use of the smart card reader. As a result, handheld device 400 remains in compliance with the ATEX Directives.

In this embodiment, the customer provides attendant 600 with a smart card, which is read using the smart card reader. Handheld device 400 transmits data representative of the information provided by the smart card to site controller 308 via the wireless mesh network of fueling environment 300. The process continues in a manner similar to that described above.

In another embodiment, handheld device 400 and fuel dispensers 200a and 200b are configured to handle financial transactions for the fuel provided by the dispensers. In such an embodiment, handheld device 400 is configured to perform the functions and tasks previously performed by site controller 308 associated with carrying out the financial transactions. For instance, handheld device 400 may be configured to execute financial transactions with the financial institution(s) connected to the WAN and to store data representative of the financial transactions within memory 408 or on removable media via memory slot 414. It should be understood that the fuel dispensers and the handheld device may continue to transmit data associated with the financial transactions to site controller 308 for reporting or other purposes as explained above.

In a scenario involving a prepaid cash transaction, attendant 600 may authorize a fuel dispenser, such as fuel dispenser 200a, directly using handheld device 400 rather than via site controller 308. In one example, attendant 600 receives cash from a customer and enters the value of the case into handheld device 400. In this embodiment, handheld device 400 does not transmit data to site controller 308 representative of the fueling transaction such as the dispenser selected by the customer or the cash provided to the attendant. Instead, the middleware executed by processing device 406 causes handheld device 400 to authorize directly the fuel dispenser 200a via the wireless mesh network.

It should be understood that, in an embodiment where handheld device 400 is configured to handle financial transactions associated with the fueling process, the inclusion of user interface 202 (FIG. 2) within fuel dispensers 200 may be unnecessary. That is, the fuel dispensers do not require any input devices in such an embodiment because the financial transactions associated with the dispensed are carried out by handheld device 400. This is because handheld device 400 includes the capabilities necessary to effect the transactions for the fuel provided by the dispensers. It should be understood that providing dispensers without a user interface may substantially reduce the manufacturing and maintenance costs associated with the fuel dispensers.

In a scenario involving payment by a customer using a credit card, handheld device 400 receives the financial information from a magnetic card provided by the customer in the manner described above. The middleware of handheld device 400 determines the data necessary to send to the financial institution based on the information received from the card once it has been swiped through the handheld device's card reader. Handheld device 400 transmits the data via the wireless mesh network to the financial institution. In an embodiment where wireless communication device 100e functions as a gateway, it handles communication of the data with the financial institution and routes any returned data to handheld device 400 via the wireless mesh network in a manner similar to that described above. Based on the information transmitted to handheld device 400, processing device 406 determines whether to authorize fuel dispenser 200a, and, if so, transmits data representative of the authorization to the fuel dispenser via the wireless mesh network. The process then continues in a manner similar to that described above.

It should be understood that in an embodiment where handheld device 400 and/or fuel dispensers 200a and 200b are configured to carry out transactions directly with the financial institution, central facility 302 may be unnecessary. That is, because fuel dispensers 200a and 200b and handheld device 400 handle the financial transactions with the relevant financial institution directly, the requirement that the components and devices located within central facility 302 be located within fueling environment 300 is eliminated.

In such an embodiment, handheld device 400 and fuel dispensers 200a and 200b may be configured to transmit data associated with the transactions conducted by the respective device to a reporting server external to fueling environment 300. That is, after each transaction, handheld device 400 and/or fuel dispensers 200a and 200b transmit data representative of the transaction to a remote reporting server via the wireless mesh network and the WAN. The remote reporting server maintains a collection of information transmitted from the devices of fueling environment 300 for reporting or other purposes as well as from devices of other fueling environments. It should be understood that fuel dispensers 200a and 200b and handheld device 400 may be configured to transmit only data that does not contain sensitive or confidential information. As a result, the data transmissions, as well as the receiving devices, would not be required to comply with certain security regulations.

It should be further understood that other devices within fueling environment 300 may also be configured to communicate with devices and computers located on the WAN in the same manner. For instance, the middleware of wireless communication devices 100 may be configured to access and retrieve resources provided by remote servers connected to the WAN. For instance, wireless communication devices 100a and 100b may retrieve material from servers connected to the WAN and maintained by third parties including driving directions, advertisements, and information regarding local amenities. Wireless communication devices 100a and 100b provide the information to processing devices 204 to be presented by display 208 (FIG. 2). In such an embodiment, fuel dispensers 200a and 200b may be configured to communicate with the remote resources via the wireless mesh network and the WAN.

For another example, sensor 320 connected to UST 314 may determine that the volume of fuel in the tank has reached a relatively low level and outputs data representative of the volume to wireless communication device 100h. In one embodiment, wireless communication device 100h transmits the data to site controller 308 via the wireless mesh network for handling. Alternatively, wireless communication device 100h is configured to transmit the relevant data to a service external to fueling environment 300 that is tasked with managing the amount of fuel within multiple fueling environments. For instance, a fueling management depot connected to the WAN may be responsible for management of the fuel supplied to various fueling stations, including fueling environment 300. Wireless communication device 100h transmits the relevant data regarding the volume of fuel within UST 314 to the management depot via the wireless mesh network and the WAN. The fueling management depot may be configured to automatically direct or redirect a fueling tanker to fueling environment 300 in order to supply UST 314 with fuel.

In another embodiment, data from components within fueling environment may be routed to multiple recipients and/or destinations via the wireless mesh network. Referring to FIG. 6, for example, sensor 318 outputs data if it determines that UST 312 has malfunctioned. Wireless communication device 100g is configured to transmit the data representative of the malfunction to site controller 308, as well as to a device associated with a service technician external to fueling environment 300, via the wireless mesh network. In one embodiment, site controller 308 also handles transmission of the data to the service technician's device. In another embodiment where wireless communication device 100e is configured to function as a gateway, gateway 100e handles transmission of the data to the service technician's device via the WAN.

In the presently-described embodiment, the data transmitted by the wireless communication device 100g may be transmitted via distinct paths to both gateway 100e and site controller 308. Alternatively, the data may be transmitted via the same path until it reaches a specific point where the data is then routed via separate paths over the wireless mesh network to gateway 100e and to site controller 308. For instance, data intended for both recipients may be transmitted to gateway 100e. The middleware of gateway 100e instructs the gateway to route the transmission to the service technician's device via the WAN and to route the data to site controller 308 via the wireless mesh network.

In another embodiment, the components of fueling environment 300 may be configured to transmit data to the nearest handheld device, such as handheld device 400, via the wireless mesh network. For instance, fuel dispenser 200b may be configured to transmit data representative of a hardware failure or malfunction to handheld device 400 via the wireless mesh network. As a result, handheld device 400 presents attendant 600 with the data, who is able to analyze, identify, and potentially resolve the issue. For instance, fuel dispenser 200b may be configured to send a transmission to handheld device 400 via the wireless mesh network when the receipt printer is out of paper. In this embodiment, the handheld device's GUI is configured to alert its operator when the problem has been detected.

Referring to FIGS. 5 and 6, the GUIs displayed via touch screen 500 may be configured to present buttons and indicia corresponding to other devices within fueling environment 300. For instance, the GUI may display indicia representative of vending machine 322 and camera 324. In this embodiment, selecting the indicia provides information regarding the operation of the respective device. For example, selecting the indicia associated with vending machine 322 may provide a status of the machine's inventory while selecting the indicia associated with camera 324 may provide a feed to the camera's video footage.

In another embodiment, the wireless communication devices connected to components within fueling environment 300 may be configured to transmit data periodically indicating the status of the component to which the device is connected. For example, vending machine 322 may be configured to output data representative of its inventory levels to wireless communication device 100i at predetermined intervals of time as described above. Wireless communication device 100i transmits this information to site controller 308 or to handheld device 400. When inventory drops below a predefined level, the information transmitted by the vending machine informs the intended recipient that the vending machine requires additional inventory. As a result, the operator of the receiving device can refill the vending machine's inventory. Additionally, if wireless communication device 100i has not received data from the vending machine or if the intended recipient has not received data from wireless communication device 100i for greater than a predefined amount of time, the intended recipient notifies its operator to inspect vending machine 322 and/or wireless communication device 100i to determine if either has malfunctioned or stopped working.

In another embodiment with reference to FIGS. 4 and 6, handheld device 400 comprises an RF identification ("RFID") reader configured to send and receive radio signals to and from an RFID tag. In this embodiment, an RFID tag unique to each fuel dispenser of fueling environment 300 is placed within the dispenser's interior. In order to authorize the fuel dispenser for use, attendant 600 scans the RFID tag with the handheld device's RFID reader. The RFID reader transmits the information received from the RFID tag to processing device 406, which identifies the fuel dispenser corresponding to the tag. Handheld device 400 then communicates with the fuel dispenser via the wireless mesh network and the fueling process proceeds in a manner similar to that described above.

In another embodiment, handheld device 400 comprises a Bluetooth radio device configured to communicate with other Bluetooth devices located within fueling environment 300. In such an embodiment, dispensers 200a and 200b are each equipped with a Bluetooth device operatively connected to the dispenser's processing device and configured to communicate with other Bluetooth devices, such as the one in handheld device 400. In this embodiment, the handheld device and the dispensers communicate via a Bluetooth personal area network ("PAN") in order to authorize the fuel dispensers and to effect transactions for payment of any fuel provided by the dispensers. In this embodiment, handheld device 400 and dispensers 200*a* and 200*b* may still be configured to communicate with other devices both internal and external to fueling environment 300 via the wireless mesh network in a manner similar to that described above.

It should be understood by those of ordinary skill in the art that handheld device 400 also operates as a node of the wireless mesh network of fueling environment 300. Thus, handheld device 400 may be used to route data transmitted via the wireless mesh network. For instance, wireless communication device 100*a* may determine that it is unable to communicate with wireless communication device 100*e* directly but may be able to communicate with it indirectly by transmitting the applicable data via handheld device 400. After analyzing the data to determine its intended destination, handheld device 400 transmits the data to wireless communication device 100*e* via the wireless mesh network, which may include a direct line of transmission. Alternatively, handheld device 400 may be unable to communicate directly with wireless communication device 100*e* due to environmental factors. In this instance, handheld device 400 transmits the data to wireless communication device 100*e* via one or more of the other nodes of the wireless mesh network.

Additionally, each handheld device stores data representative of the transactions carried out by the handheld device and by each operator of the device. This provides a manager with the ability to create reports for each handheld device and for each operator regarding the transactions managed by the handheld device or operator for the fueling environment. In one embodiment, handheld device 400 transmits this data to site controller 308 via the wireless mesh network. Alternatively, the handheld device stores this data on external media that has been inserted into its memory slot 414.

It should be further understood that the middleware stored in memory and executed by the processing device of each wireless communication device creates a "plug and play" environment. That is, wireless communication devices and components equipped with such devices may be added to fueling environment 300 at any time without degrading the wireless mesh network. The middleware described above enables any additional device to communicate via the wireless mesh network of the fueling environment. It should be further understood that the conversion component enables legacy or non-standard devices to communicate with the middleware, which enables the legacy or non-standard devices to communicate with other devices via the wireless mesh network. Additionally, the fueling environment described herein is scalable, meaning that devices may be added to and removed from the fueling environment without affecting the wireless mesh network or the environment's other devices.

According to another embodiment, the present invention provides a low cost yet very secure solution for vehicle identification, utilizing "transponder" technology. The system can also desirably ensure that the nozzle is actually in the vehicle's fuel tank during the whole refueling process.

In particular, the proposed solution uses a handheld forecourt controller (as described above) enabled with Zigbee or the like. This handheld device may be installed on the nozzle by the operator and may contain a two-antenna tag reader— able to read a tag installed on the nozzle and one installed on the vehicle near the tank opening. When the nozzle is inserted, the handheld can read the nozzle ID and the vehicle ID, and access a remote database wirelessly so as to get the authorization for that dispenser. Because the antennas will preferably read only short distance, if the handheld is removed, or the nozzle is removed from the tank, the handheld will detect this event and immediately (e.g., via Zigbee) stop the transaction. Some advantages of such a system are: (1) Installation is easier than any other known solution; (2) Power is within the handheld, which can be recharged; (3) Because the handheld is ATEX, no further approvals are required; (4) Tags on nozzle are inexpensive and simply be glued in place. (5) Vehicle tags on vehicle are also inexpensive. (6) No physical wiring is required on vehicle or on site.

A mechanism can be provided to attach the handheld on the nozzle itself. The two transponder/proximity readers installed in the handheld can be configured such that the reading distance could be as short as desired. In such an embodiment, one reader will read underneath the handheld (to read a tag on the nozzle), whereas the other one can read on a side (to read the tag on the vehicle). The nozzle transponder can simply be glued or otherwise attached to the side of the nozzle. The vehicle transponder could be similarly installed in proximity of the car tank opening and in such a position that it would be in the range of the handheld reader once the nozzle with the piggy back handheld is close enough or actually inside the tank opening.

Once the operator has installed the handheld on the nozzle, the nozzle is inserted into the tank, as normally done. The handheld would immediately read the tag on the vehicle, send via Zigbee a message to the existing forecourt controller (equipped with a Zigbee receiver) containing the tag content, and consequently activate a new transaction for the dispenser requiring the authorization. If the nozzle or the handheld are removed, the transaction is stopped.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope of the appended claims and their equivalents.

What is claimed is:

1. A retail fueling environment comprising:
a plurality of fuel dispensers located in a forecourt area of said fueling environment;
a central controller operative to communicate with a remote payment authorization system to authorize payment of fueling transactions;
said fuel dispensers and said central controller having a respective wireless communication device associated therewith such that said fuel dispensers can communicate with said central controller via wireless transmission, said wireless communication devices of said fuel dispensers being in electrical communication with an internal processing device of the fuel dispensers used to control delivery of fuel by the fuel dispensers; and
each of said wireless communication devices implementing a middleware program such that said wireless communication devices serve as nodes in a wireless mesh network wherein communication between said fuel dispensers and said central controller can occur via an alternative transmission path if transmission via a first transmission path is unavailable.

2. A retail fueling environment as set forth in claim 1, further comprising:
- at least one fuel storage tank in said retail fueling environment having a fuel level sensor associated therewith;
- a further wireless communication device associated with said fuel level sensor, said further wireless communication device also serving as one of said nodes in said wireless mesh network.

3. A retail fueling environment as set forth in claim 2, further comprising at least one of a vending machine and a surveillance camera in said fueling environment, said at least one of said vending machine and said surveillance camera having a respective wireless communication device also serving as one of said nodes in said wireless mesh network.

4. A retail fueling environment as set forth in claim 1, further comprising at least one wireless communication device situated in said fueling environment but not associated with a forecourt component, said additional wireless communication device serving as a repeater node in said wireless mesh network.

5. A retail fueling environment as set forth in claim 1, wherein communications within said wireless mesh network are encrypted.

6. A retail fueling environment as set forth in claim 1, wherein each of said fuel dispensers utilizes a legacy communication protocol, said wireless communication device further implementing a conversion program that allows communication between said legacy communication protocol and said middleware.

7. A retail fueling environment as set forth in claim 1, further comprising a handheld device utilized by an attendant in said fueling environment to control fueling transactions.

8. A retail fueling environment as set forth in claim 7, wherein said handheld device includes a local wireless communications device in its housing that functions as a node in said wireless mesh network.

9. A retail fueling environment as set forth in claim 7, wherein each of said fuel dispensers has an radio frequency identification (RFID) tag associated therewith, said handheld device incorporating an RFID reader.

10. A retail fueling environment as set forth in claim 7, wherein said handheld device has a touchscreen on which a graphical user interface is displayed for use by said attendant.

11. A retail fueling environment as set forth in claim 1, wherein said fuel dispensers each have a user interface that allows for payment of said fueling transactions at said fuel dispensers.

12. A retail fueling environment as set forth in claim 10, wherein said user interface includes a card reader.

13. A retail fueling environment as set forth in claim 11, wherein said user interface includes a numeric pad.

* * * * *